US010874995B2

(12) United States Patent
Ransom et al.

(10) Patent No.: US 10,874,995 B2
(45) Date of Patent: Dec. 29, 2020

(54) APPARATUS FOR MIXING FLUIDS, INCLUDING FLUIDS CONTAINING SOLIDS

(71) Applicants: Michael Ransom, Victoria (CA); Jeffrey Hawkes, Victoria (CA)

(72) Inventors: Michael Ransom, Victoria (CA); Jeffrey Hawkes, Victoria (CA)

(*) Notice: Subject to any disclaimer, the term of this patent is extended or adjusted under 35 U.S.C. 154(b) by 164 days.

(21) Appl. No.: 16/072,676

(22) PCT Filed: Jan. 25, 2017

(86) PCT No.: PCT/CA2017/050078
§ 371 (c)(1),
(2) Date: Jul. 25, 2018

(87) PCT Pub. No.: WO2017/127925
PCT Pub. Date: Aug. 3, 2017

(65) Prior Publication Data
US 2019/0030496 A1 Jan. 31, 2019

Related U.S. Application Data

(60) Provisional application No. 62/287,353, filed on Jan. 26, 2016.

(51) Int. Cl.
*B01F 3/04* (2006.01)
*B01F 5/06* (2006.01)
(Continued)

(52) U.S. Cl.
CPC .......... *B01F 3/04503* (2013.01); *B01F 5/061* (2013.01); *B01F 5/102* (2013.01); *B01J 19/245* (2013.01); *B01F 5/0655* (2013.01)

(58) Field of Classification Search
CPC ...... B01F 3/04503; B01F 5/061; B01F 5/102; B01F 5/0655; B01J 19/245
(Continued)

(56) References Cited

U.S. PATENT DOCUMENTS 3,074,786 A 1/1963 Duthie
3,638,917 A * 2/1972 Osten ................. B01F 7/26
366/149
(Continued)

FOREIGN PATENT DOCUMENTS

CA 2035664 A 9/1991
EP 0256965 A2 2/1988
WO 2000029545 A1 5/2000

OTHER PUBLICATIONS

Canadian Intellectual Property Office, "International Search Report", dated Mar. 8, 2017, 2 pages, Quebec, CA.

*Primary Examiner* — Charles S Bushey
(74) *Attorney, Agent, or Firm* — Tomlinson McKinstry, P.C.

(57) ABSTRACT

An apparatus for mixing fluids, with particular application in the mixing of air and water for facilitating aerobic biological reactions for breaking down organic material. The apparatus includes gas-lift pump effected recirculation through a mixing chamber (in which a toroidal vortex is established) into a reactor vessel having an upper agitation region and a lower separation region. An embodiment for use with compostable materials includes an assembly for handling settleable solids and maintaining suspension of buoyant materials; a foam suppression device and an overflow reservoir.

15 Claims, 10 Drawing Sheets

(51) Int. Cl.
*B01F 5/10* (2006.01)
*B01J 19/24* (2006.01)

(58) Field of Classification Search
USPC .................................. 261/28, 29, 36.1, 79.2
See application file for complete search history.

(56) References Cited

U.S. PATENT DOCUMENTS

| | | | | |
|---|---|---|---|---|
| 5,060,867 | A * | 10/1991 | Luxton | F23D 14/02 239/428.5 |
| 5,397,179 | A * | 3/1995 | Berlin | B01F 5/0646 138/38 |
| 7,270,538 | B2 * | 9/2007 | Sicilia | B23P 15/007 425/566 |
| 2006/0051448 | A1 * | 3/2006 | Schryver | B01F 5/0646 425/381 |
| 2006/0219161 | A1 * | 10/2006 | Wakamatsu | B01F 3/02 117/200 |
| 2012/0171090 | A1 * | 7/2012 | Chang | B01F 5/0647 422/641 |
| 2014/0348598 | A1 * | 11/2014 | Leininger | F23K 3/02 406/122 |
| 2016/0001255 | A1 | 1/2016 | Luo et al. | |

* cited by examiner

440

450

460

APPARATUS FOR MIXING FLUIDS, INCLUDING FLUIDS CONTAINING SOLIDS

CROSS REFERENCE TO RELATED APPLICATIONS

This application claims the benefit of U.S. Patent Application No. 62/287,353, filed 26 Jan. 2016.

FIELD OF THE INVENTION

The present invention relates to the field of fluid mixing, particularly mixing of air and water for use in facilitating aerobic biological reactions for composting.

BACKGROUND OF THE INVENTION

Efficient mixing of fluids is important in many devices and processes. Conventionally, mixing has been achieved by mechanically agitating fluids, for example, with the use of paddles or blades. More modern mixing technologies use the properties of fluid dynamics to achieve mixing. Eductors, or jet pumps, accomplish mixing by contacting an accelerated jet of a first fluid with a relatively stationary second fluid. Flow instabilities at the first fluid's boundary layer as well as the reduced pressure within the accelerated fluid results in some entrainment of the second fluid within the first fluid. Developments in such eductor mixing have included distorting the nozzle outlet to produce eddies within the flow, and pulsating the velocity or pressure of the first fluid.

Organic waste treatment systems utilizing biological processes (e.g., for treatment of industrial waste, agricultural waste and sewage, and including composting systems) are conventionally divided into anaerobic and aerobic systems. In aerobic waste treatment systems, bacteria utilize oxygen to degrade organic matter (generally quantified as biochemical oxygen demand or BOD) and other materials (e.g., pollutants). The amount of dissolved oxygen available to the bacteria affects the rate at which the aerobic biological reactions occur. Insufficient dissolved oxygen is associated with poor reduction times, swings in pH, loss of key microorganisms and the production of unwanted by-products (if dissolved oxygen falls below the biochemical oxygen demand, anaerobic metabolism will commence). It is generally understood that in an aerobic waste treatment system, it is desirable to maintain at least roughly 1 to 2 mg/L of dissolved oxygen evenly throughout the system. To achieve this minimum amount of dissolved oxygen, aerobic systems generally use one or a combination of devices to both aerate and mix the water including turbines, jet aerators, air diffusers, and, in some instances, electrolysis. Such aeration and mixing systems typically involve relatively high power demands (such conventional aeration, e.g., diffuser stones, often involves relatively high operating pressures due to the small pore size required to produce small bubbles. Further, plugging of such aeration/diffusion devices is an ongoing issue and trained staff are generally required for maintenance and trouble-shooting of the aeration equipment. Further, aeration in such systems may involve use and handling of oxygen, either pure oxygen or at least a mixture of gases containing oxygen in a higher proportion than in ambient air.

SUMMARY OF THE INVENTION in this specification, including the claims, "water" may refer to water in combination with a range of amounts and types of other materials, including water with relatively low impurities (e.g., potable water), and water in combination with significant amounts of dissolved and/or suspended and/or floating material.

In one aspect, the present invention provides a mixing body for use in mixing fluids and agitating adjacent fluids. The mixing body includes at least one mixing chamber with an inlet and an outlet and an inner cavity between the inlet and outlet, the inner cavity having a cross sectional area greater than the cross sectional area of each of the inlet and outlet, such that a flow of fluids from the inlet to the outlet via the inner cavity, establishes a toroidal vortex about the periphery of the inner cavity, thus mixing the fluids.

If one of the fluids is a gas and the other is a liquid, the flow of fluids from the inlet to the outlet via the inner cavity may be induced by a gas lift pump effect resulting from intermingling the gas and liquid in the vicinity of the mixing chamber inlet. Such gas lift pump induced flow continues upwards from the mixing chamber and tends to agitate fluids above the mixing body.

A mixing body as generally described above, may be configured for immersion in the liquid, with gas supplied to the vicinity of the mixing chamber inlet. With such a configuration, the resulting gas lift pump effect draws in liquid from the liquid adjacent the mixing chamber inlet and expels the mixed gas and liquid from mixing body, whereby the mixed gas and liquid rises and agitates the liquid above the mixing body. Such a configuration may be suitable for aerobic sewage treatment in which the gas is air and the liquid is a sewage slurry containing water. It is understood that in such a configuration a mixing body as described herein will provide adequate aeration and agitation/mixing at reduced power cost (negligible back pressure in the air supply system) and reduced maintenance cost (no small pores to plug).

As another alternative, a mixing body as generally described above, may be configured as an inline component in a contained system/assembly.

In a preferred embodiment, the present invention provides an assembly for accelerating aerobic biological reactions for breaking down compostable material (e.g., kitchen waste) in which flow and circulation of water in the assembly is effected by a gas lift pump effect created by low pressure compressed air. The gas lift pump induced flow of the water and air through a mixing chamber having an expanded internal cavity induces a toroidal vortex within the cavity that enhances mixing of the air and water, producing high aeration. The gas lift pump induced flow of the highly aerated water into a reaction chamber containing compostable material causes significant mixing and agitation of the water, air and compostable material mixture (including a toroidal vortex about the inner wall of the reactor vessel).

In one aspect the present invention provides an apparatus for mixing a first fluid and a second fluid, for enabling reactions involving the first fluid and the second fluid, the apparatus including: a mixing body including first mixing chamber having: a first chamber cavity with a first cavity inner periphery and a first chamber cavity cross sectional area, being the cross sectional area at the first chamber cavity inner periphery; a first chamber inlet into the first chamber cavity, having a first chamber inlet cross sectional area; a first chamber outlet from the first chamber cavity, having a first chamber outlet cross sectional area; and a first chamber distance being the distance between the first chamber inlet and the first chamber outlet; wherein: the first chamber inlet cross sectional area is in the range of about 1 to about 2 times the first chamber outlet cross sectional area;

the first chamber cavity cross sectional area is in the range of about 10 to 20 times the first chamber outlet cross sectional area; and a square of the first chamber distance is in the range of about 10 to 20 times the first chamber outlet cross sectional area; a flow inducing means for causing a flow of the first fluid and the second fluid through the first chamber inlet to and through the first chamber outlet via the first chamber cavity; wherein the flow through the first chamber inlet to and through the first chamber outlet establishes a toroidal vortex extending about the first cavity inner periphery.

The first cavity inner periphery may be circular and have a first chamber cavity diameter.

The first chamber inlet may be circular and have a first chamber inlet diameter; and the first chamber outlet may be circular and have a first chamber outlet diameter; wherein: the first chamber inlet diameter may be in the range of about 1 to about 1½ times the first chamber outlet diameter; the first chamber cavity diameter may be about 4 times the first chamber outlet diameter; and the first chamber distance may be about 4 times the first chamber outlet diameter.

The mixing body may include a second mixing chamber having: a second chamber cavity with a second cavity inner periphery and a second chamber cavity cross sectional area, being the cross sectional area at the second chamber cavity inner periphery; a second chamber inlet into the second chamber cavity, having a second chamber inlet cross sectional area; a second chamber outlet from the second chamber cavity, having a second chamber outlet cross sectional area; and a second chamber distance being the distance between the second chamber inlet and the second chamber outlet; wherein: the second chamber inlet cross sectional area is in the range of about 1 to about 2 times the second chamber outlet cross sectional area; the second chamber cavity cross sectional area is in the range of about 10 to 20 times the second chamber outlet cross sectional area; and a square of the second chamber distance is in the range of about 10 to 20 times the second chamber outlet cross sectional area; the second mixing chamber is interconnected with the first mixing chamber wherein the flow through the first chamber inlet to and through the first chamber outlet continues through the second chamber inlet through and to the second chamber outlet via the second chamber cavity; wherein the flow through the second chamber inlet to and through the second chamber outlet establishes a toroidal vortex extending about the second cavity inner periphery.

The first fluid may be a gas; the second fluid may be a liquid; the flow inducing means may include an upstream gas introduction, being means for introducing the gas into the liquid at a location that, in terms of a direction of the flow through the first chamber inlet to and through the first chamber outlet is upstream of the first mixing chamber; and the first chamber inlet and the first chamber outlet may be vertically displaced relative to each other wherein the flow through the first chamber inlet to and through the first chamber outlet results from a gas lift effect induced by the upstream gas introduction.

The first fluid may be air and the upstream gas introduction may include an air compressor for drawing in and providing air.

The apparatus may include a reactor vessel in fluid communication with the mixing body, wherein the flow through the first chamber inlet to and through the first chamber outlet continues as flow into the reactor vessel, the reactor vessel including an air vent for venting off the air and an outflow outlet; a main recirculation conduit providing fluid communication between the reactor vessel outflow outlet and the vicinity of the location of upstream gas introduction; whereby liquid in the reactor vessel may flow to the location of upstream gas introduction via the main recirculation conduit.

The second fluid may include water; the reactor vessel may include an inlet for receiving organic material into the reactor vessel and a reactor vessel inner wall; the flow into the reactor vessel establishes a reactor vessel toroidal vortex extending about the reactor vessel inner wall: whereby the reactor vessel toroidal vortex agitates the air, water and organic material, so as to facilitate aerobic biological reactions.

The reactor vessel includes an internal partial divider defining: an upper agitation region in which the reactor vessel toroidal vortex is located; and a lower separation region in which the outflow outlet is located. The internal partial divider may include a central opening and a permeable basket wall.

The apparatus may include an overflow line; and a separation assembly interposed between the reactor vessel and the main recirculation conduit, and including: a settleable solids return vessel for receiving water from the reactor vessel and returning water containing settleable solids to the lower separation region; and a particle suspension vessel for: receiving water with lowered settleable solids from the settleable solids return vessel; enhancing suspension of buoyant material in the water with lowered settleable solids; conveying the water with enhanced suspension of buoyant material and lowered settleable solids to the main recirculation conduit; and intermittently passing water to the overflow line.

The apparatus may include an overflow reservoir connected to the overflow line. The overflow reservoir may include an air diffuser in fluid communication with the air compressor.

The apparatus may include means for suppressing foam within the reactor vessel, including: a wash assembly disposed at the top of the reactor vessel; a wash assembly supply pipe providing fluid communication between the main recirculation conduit and the wash assembly; and a wash air supply line providing fluid communication between the air compressor and the wash assembly supply pipe; wherein air provided by the air compressor flows to the wash assembly supply pipe via the wash air supply line, inducing a gas lift effect in the wash assembly supply pipe that draws liquid from the main recirculation conduit and conveys the liquid to the wash assembly where it is dispersed within the reactor vessel.

The first mixing chamber may be substantially spheroidal. The first mixing chamber may be conical in the vicinity of the first chamber outlet and cylindrical at the first cavity inner periphery. The first mixing chamber may be conical in the vicinity of the first chamber inlet. The first mixing chamber may be planar in the vicinity of the first chamber inlet.

DETAILED DESCRIPTION WITH REFERENCE TO THE DRAWINGS

Figure 1:
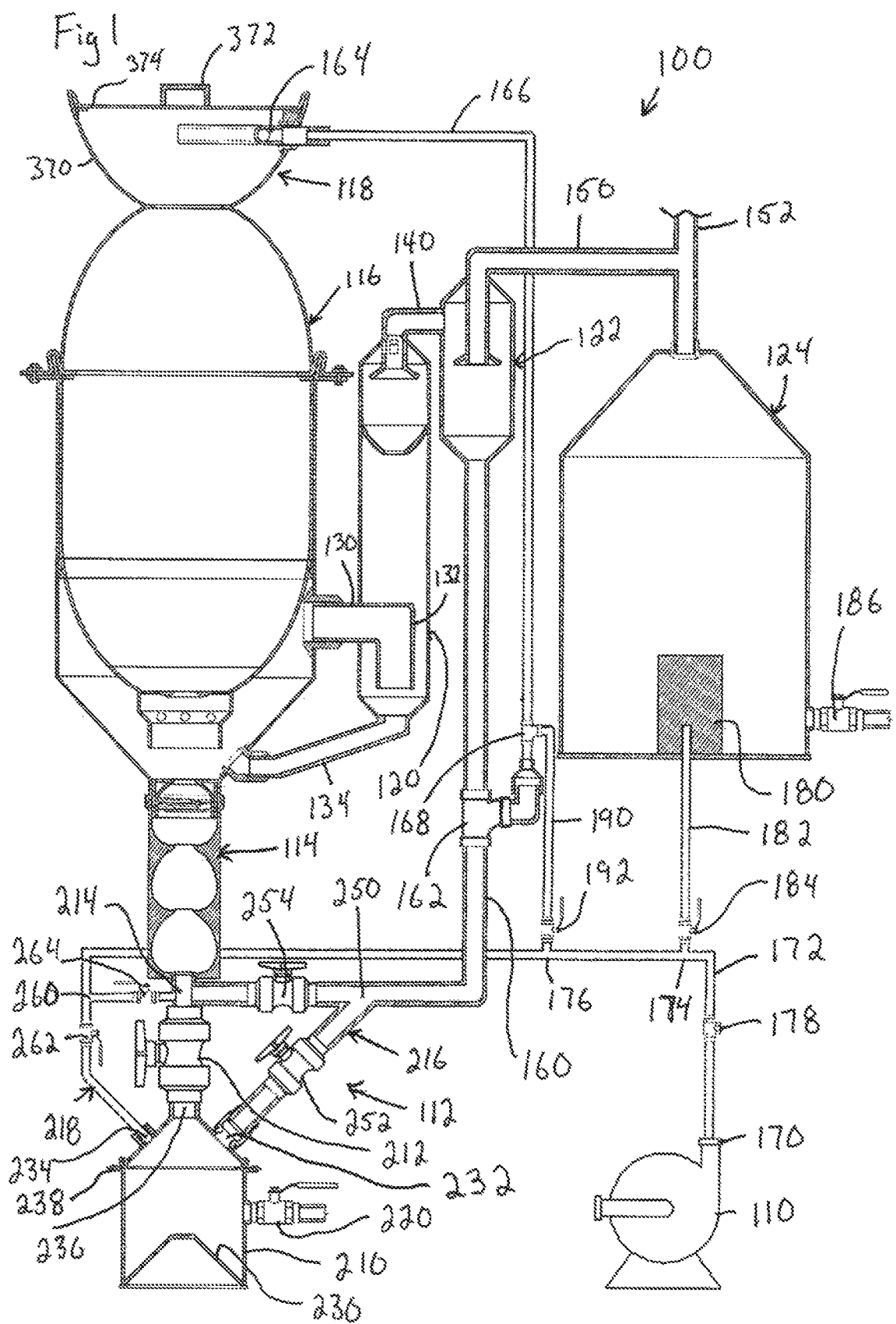
FIG. 1 is an elevation partially sectional view of a composting apparatus embodiment of the present invention.

As shown in the drawings, embodiments of the present invention include a composting apparatus 100 including: an air compressor 110, a receiving/settling assembly 112 which is below and inline with an aeration body 114 which is below and inline with a reactor vessel 116; a hopper assembly 118 affixed to the top of the reactor vessel 116; a settleable solids return vessel 120; a particle suspension vessel 122; and an overflow reservoir 124.

Interposed between, and interconnecting, the reactor vessel 116 and settleable solids return vessel 120, there is: a reactor vessel outflow 130 continuing to a reactor vessel outflow downspout 132 located within the settleable solids return vessel 120; and a reactor vessel return 134.

Interposed between, and interconnecting, the settleable solids return vessel 120 and the particle suspension vessel 122, there is a return vessel to suspension vessel conduit 140.

Interposed between, and interconnecting, the particle suspension vessel 122 and the overflow reservoir 124 there is an overflow pipe 150 with an attached overflow pipe vent to atmosphere 152.

Interposed between, and interconnecting, the particle suspension vessel 122 and the receiving/settling assembly 112 there is a main liquid recirculation pipe 160. The main liquid recirculation pipe 160 includes a wash assembly supply Tee 162 along the length of the main liquid recirculation pipe 160.

Interconnecting the wash assembly supply Tee 162 and the wash assembly 164 (the wash assembly 164 is integrated with the hopper assembly 118 and in use suppresses foam), there is a wash assembly supply pipe 166. The wash assembly supply pipe 166 includes a wash assembly air lift Tee 168 along the length of the wash assembly supply pipe 166.

The air compressor 110 includes an air compressor outlet 170. Interconnecting the air compressor outlet 170 and the receiving/settling assembly 112 there is an air supply line 172. The air supply line 172 includes an overflow reservoir air supply Tee 174 and a wash assembly air supply Tee 176, along the length of the air supply line 172. The air supply line 172 also includes an air supply check valve 178 located along the length of the air supply line 172 upstream of the overflow reservoir air supply Tee 174 and the wash assembly air supply Tee 176.

Interconnecting the overflow reservoir air supply Tee 174 and an overflow reservoir air diffuser 180 (the overflow reservoir air diffuser 180 is located within the overflow reservoir 124 and may be any conventional air diffuser, for example a diffuser stone), there is an overflow diffuser air supply line 182. The overflow diffuser air supply line 182 includes an overflow diffuser air throttle valve 184 (e.g., a needle valve) along the length of the overflow diffuser air supply line 182. An overflow reservoir drain valve 186 is attached to the overflow reservoir 124.

Interconnecting the wash assembly air supply Tee 176 and the wash assembly air lift Tee 168, there is a wash air supply line 190. The wash air supply line 190 includes a wash air supply throttle valve 192 (e.g., a needle valve) along the length of the overflow diffuser air supply line 182.

The receiving/settling assembly 112 includes a receiving/settling vessel 210, a receiving/settling vessel shutoff valve 212 above and inline with the receiving/settling vessel 210; an air-liquid cross 214 above and inline with the receiving/settling vessel shut off valve 212; a liquid receiving assembly 216; an air receiving assembly 218; and a system drain valve 220 attached to the receiving/settling vessel 210.

The receiving/settling vessel 210 includes an internal bottom projection 230 (akin to a "punt" in a wine bottle); a liquid receiving port 232; an air receiving port 234; an outflow port 236 (connected to the receiving/settling vessel shut off valve 212) and a user separable receiving/settling vessel body flange connector 238. Preferably, the liquid receiving port 232, air receiving port 234 and outflow port 236 are configured for quick connection and disconnection.

The liquid receiving assembly 216 includes a liquid Y fitting 250 connected to: the main liquid recirculation pipe 160; a receiving vessel liquid shutoff valve 252 (connected to the liquid receiving port 232); and to a cross liquid shutoff valve 254 (connected to the air-liquid cross 214), wherein the receiving vessel liquid shutoff valve 252 and the cross liquid shutoff valve 254 may be used to selectively direct liquid flowing from the main liquid recirculation pipe 160 to either the liquid receiving port 232 or the air-liquid cross 214. Similar functionality could be achieved with a Y valve.

The air receiving assembly 218 includes an air receiving Tee fitting 260 connected to: the air supply line 172; a receiving vessel air throttle valve 262 (connected to the air receiving port 234); and to a cross air throttle valve 264 (connected to the air-liquid cross 214), wherein the receiving vessel air throttle valve 262 and the cross air throttle valve 264 may be used to selectively direct air flowing from the air supply line 172 to either the air receiving port 234 or the air-liquid cross 214, and to throttle such air flow. Similar functionality could be achieved with a single throttle valve (e.g., a needle valve) upstream of a Y valve.

In normal operation, the receiving/settling vessel shutoff valve 212, receiving vessel liquid shutoff valve 252 and receiving vessel air throttle valve 262 are open, and the cross liquid shutoff valve 254 and cross air throttle valve 264 are closed. If the user desires to isolate and/or remove the receiving/settling vessel 210 for flushing or cleaning, without discontinuing the general functioning of the composting apparatus 100, the user may do so by: opening the the cross liquid shutoff valve 254 and cross air throttle valve 264; closing the receiving/settling vessel shutoff valve 212, receiving vessel liquid shutoff valve 252 and receiving vessel air throttle valve 262; draining liquid from the receiving/settling vessel 210 by opening the system drain valve 220; disconnecting the receiving/settling vessel 210 from the receiving/settling vessel shut off valve 212, receiving vessel liquid shutoff valve 252 and receiving vessel air throttle valve 262; and if desirable, breaking down the receiving/settling vessel 210 by separating the receiving/settling vessel body flange connector 238.

The aeration body 114 includes: a first aeration chamber 270 (connected to the air-liquid cross 214 via a first choke 272); a second aeration chamber 274 connected to the first aeration chamber 270 via a second choke 276; a third aeration chamber 278 connected to the second aeration chamber via a third choke 280; a choke-mesh assembly 282 (comprising an aeration choke ring 284 affixed to: an annular, planar, horizontally extending aeration mesh plate 286; and a quasi-conical aeration mesh ceiling 288 (the aeration mesh ceiling 288 generally defining the upper wall/ceiling of the third aeration chamber 278)); and an aeration body threaded connector 290 having female threads.

The reactor vessel 116 includes: a reactor vessel conical bottom 300 (including a downward projecting threaded stub 302, having male threads configured to threadedly engage the aeration body threaded connector 290 while receiving a top section of the aeration body 114 within the threaded stub 302); a reactor vessel cylindrical mid-body 304; a reactor vessel parabolic top 306 (having a parabolic top inlet 308); a reactor vessel mid-top flange connector 310; a reactor vessel return inlet 312 (being the opening in the reactor vessel conical bottom 300 at which the reactor vessel return 134 connects to the reactor vessel 116); a reactor vessel outflow outlet 314 (being the opening in the reactor vessel cylindrical mid-body 304 at which the reactor vessel outflow 130 connects to the reactor vessel 116); a mix mediator 316; and a basket assembly 318.

The mix mediator 316 includes: a cylindrical mediator lower inlet 330; a conical mediator expansion shoulder 332 having expansion shoulder ports 334 (being an array of spaced-apart openings through the mediator expansion shoulder 332); a cylindrical mediator upper section 336; a mediator choke ring 338; and an annular, planar, horizontally extending mediator mesh plate 340.

The basket assembly 318 includes: a basket bottom bowl 350, being a flaring ring extending upwards and outwards from the upper outer periphery of the mix mediator 316; and a basket mesh wall 352 extending between the upper edge of the basket bottom bowl 350 and the inner wall of the reactor vessel cylindrical mid-body 304.

The mix mediator 316 and the basket assembly 318 functionally define two general regions within the reactor vessel 116, the reactor vessel agitation region 360, which is above the mix mediator 316 and the basket assembly 318; and the reactor vessel separation region 362, which is below the mix mediator 316 and the basket assembly 318. The bottom of the reactor vessel agitation region 360, as defined by the mix mediator 316 and the basket assembly 318, has a general parabolic configuration.

The hopper assembly 118 includes: the wash assembly 164 (as mentioned previously); a hopper body 370 (attached to the reactor vessel 116 at, and configured for feeding into, the parabolic top inlet 308); and a hopper lid 372 (having hopper lid vents 374). The wash assembly 164 comprises a simple piping arrangement (in the current embodiment, a Tee, two 90's and two pipe stubs) for receiving liquid from the wash assembly supply pipe 166 and drizzling or splashing the liquid within the hopper body 370 to suppress/break down foam.

The settleable solids return vessel 120 contains the reactor vessel outflow downspout 132 (as mentioned previously). The settleable solids return vessel 120 includes: a reactor vessel return outlet 380 (at the bottom of the settleable solids return vessel 120 and at which the reactor vessel return 134 is connected to the settleable solids return vessel 120); a return to suspension outlet 382 (at the top of the settleable solids return vessel 120 and at which the return vessel to suspension vessel conduit 140 is connected to the settleable solids return vessel 120); and internal return vessel baffling 384.

In normal operation, within the settleable solids return vessel 120, the flow volume from the reactor vessel outflow 130 to the return vessel to suspension vessel conduit 140, is greater than the flow from the reactor vessel outflow 130 to the reactor vessel return 134. The settleable solids return vessel 120 is configured to tend to cause settleable solids (e.g., material with a specific gravity greater than that of water) suspended in liquid received from the reactor vessel 116 (via the reactor vessel outflow 130) to return to the reactor vessel 116 (via the reactor vessel return 134). The reactor vessel outflow downspout 132 is above and aligned with the reactor vessel return outlet 380 so as to direct settleable solids into the reactor vessel return outlet 380. As well, the diameter of the settleable solids return vessel 120 is greater than the diameter of the reactor vessel outflow 130 and reactor vessel outflow downspout 132, resulting in a reduction in flow velocity within the settleable solids return vessel 120, which facilitates settling of settleable solids toward the reactor vessel return outlet 380. As well, the return vessel baffling 384 also affects the flow velocity and facilitates settling of settleable solids toward the reactor vessel return outlet 380.

The particle suspension vessel 122 includes: a suspension vessel inlet 390 (in the vicinity of the top of the particle suspension vessel 122 and connected to the return vessel to suspension vessel conduit 140); a main liquid recirculation outlet 392 (at the bottom of the particle suspension vessel 122 and connected to the main liquid recirculation pipe 160); and a central overflow conduit 394 with an overflow conduit opening 396 connected to the overflow pipe 150 and located lower than the suspension vessel inlet 390. The central overflow conduit 394 has an annular foil 398 in the vicinity of the overflow conduit opening 396. The central overflow conduit 394, annular foil 398 and general arrangement of the suspension vessel inlet 390 and interior of the particle suspension vessel 122 in the vicinity of the central overflow conduit 394, are configured to induce a cyclonic flow (i.e., relatively high flow velocity in a spiral about the cylindrical wall of the particle suspension vessel 122).

Liquid received into the particle suspension vessel 122 from the settleable solids return vessel 120 may contain buoyant material (e.g., solids with a specific gravity less than that of water, material combining heavy and light matter, etc.). The cyclonic flow within the particle suspension vessel 122 and associated flow velocity and agitation tends to cause buoyant material to be suspended within the liquid (i.e., the cyclonic flow impedes the upward movement of the buoyant material) so that the buoyant material tends to flow with the liquid into the main liquid recirculation pipe 160. Intermittently during normal operation, liquid in the particle suspension vessel 122 will flow into the overflow pipe 150; the cyclonic flow and the vertical location of the overflow conduit opening 396, tends to impede the movement of buoyant material into the overflow pipe 150.

In use, the composting apparatus 100 is filled with water (via the hopper assembly 118 or optionally via a piped connection to the water supply) to, or below, the water level at which water starts to flow into the overflow reservoir 124 via the overflow pipe 150.

Air provided by the air compressor 110 flows into the air supply line 172. If the overflow diffuser air throttle valve 184 is open (in some operational conditions the user may close the air throttle valve 184, e.g., if the overflow reservoir is 124 empty or the liquid in the overflow reservoir 124 is sufficiently aerated to minimize odors), air flows through the overflow reservoir air diffuser 180 and thence to atmosphere via the overflow pipe vent to atmosphere 152. If the wash air supply throttle valve 192 is open (in some operational conditions the user may close the wash air supply throttle valve 192, e.g., if there is no foam within the hopper body 370), the air provides the motive force for an air lift pump to lift liquid from the main liquid recirculation pipe 160 (via the wash assembly supply Tee 162), up the wash assembly supply pipe 166 to the wash assembly 164. From the wash assembly 164, the air flows to atmosphere, via the hopper lid vents 374 if the hopper lid 372 is in position on the hopper body 370.

In normal operation, the receiving vessel air throttle valve 262 is open and air flows from the air supply line 172 into the receiving/settling assembly 112, where the air provides the motive force for an air lift pump to lift liquid from the receiving/settling assembly 112 to the reactor vessel 116 via the open receiving/settling vessel shutoff valve 212, air-liquid cross 214 and aeration body 114.

Observation and modeling indicate that the upward passage of the liquid and air through the aeration body 114, generates a standing chamber toroidal vortex 410 in each of the first aeration chamber 270, second aeration chamber 274 and third aeration chamber 278 (along with associated smaller vortices and chaotic agitation). These dynamic flow patterns within the aeration chambers 270, 274, 276 produce enhanced aeration of the liquid (essentially supersaturation), in that the flow patterns both expose the air to strong pressure gradients and counter flows which significantly reduces the size of the air bubbles; and, particularly as compared to a conventional lift pump conduit having straight walls, significantly increases the amount of time in which the small bubbles of air and the liquid are kept in churning contact.

Most of the air and aerated liquid mixture exits the third aeration chamber 278 through the aeration choke ring 284, but a portion of the mixture passes through the aeration mesh ceiling 288 and aeration mesh plate 286, which assists to move detritus away from the aeration choke ring 284.

Much the air and aerated liquid mixture exiting the third aeration chamber 278 flows into the mix mediator 316. The majority of the air and aerated liquid mixture flowing into the mix mediator 316 flows upward through the mediator choke ring 338 into the reactor vessel agitation region 360 as a relatively coherent central rising column 420 of air and aerated liquid. Observation and modeling indicate that the central rising column 420 generates an upper agitation region toroidal vortex 422 and a less coherent lower agitation region toroidal vortex 424 (along with associated smaller vortices and chaotic agitation) within the reactor vessel agitation region 360.

During operation, compostable material placed in the reactor vessel agitation region 360 by the user (i.e., via the hopper assembly 118), is constantly churned and exposed to highly aerated water. The essential air supersaturation of the water is a relatively short lived phenomenon (in that the air tends to rapidly form into larger bubbles that rise to the water surface), but the general high level of aeration is maintained by the continuous replenishment of highly aerated water in the reactor vessel agitation region 360.

As the reactor vessel separation region 362 is at the bottom of the reactor vessel 116, the liquid in the reactor vessel agitation region 360 with the highest specific gravity (i.e., the liquid with the lowest aeration, due to gassing off/loss of air) tends to flow into the reactor vessel separation region 362, primarily via the basket mesh wall 352. As well, particulate matter (e.g., settleable solids, material that may be buoyant in unaerated or low aeration water, but has a specific gravity greater than that of highly aerated water, etc.) may pass into the reactor vessel separation region 362 (e.g., through the mediator choke ring 338, or if the particles are small enough, through the mediator mesh plate 340 or the basket mesh wall 352).

The flow of air and aerated liquid mixture from the third aeration chamber 278 into the mix mediator 316 and, to a lesser extent, the flow from the reactor vessel agitation region 360 to the reactor vessel separation region 362, induce circulation and flow patterns within the reactor vessel separation region 362, including the flattened, weakly coherent, separation region toroidal vortex 426 (which assists in moving potentially blocking/plugging material from the basket mesh wall 352).

The air lift pump effect raises the fluid level in the reactor vessel 116. Liquid flows from the reactor vessel separation region 362 to the settleable solids return vessel 120 via the reactor vessel outflow 130. As previously described, some of the liquid and particles (e.g., settleable solids) return to the reactor vessel separation region 362 via the reactor vessel return 134 and reactor vessel return inlet 312. As shown in the drawings, the reactor vessel return inlet 312 is adjacent the choke-mesh assembly 282 and thus some of the returned particles are carried upwards into the reactor vessel agitation region 360. Some (generally, most) of the liquid flowing into the settleable solids return vessel 120 flows to the receiving/settling vessel 210 via the particle suspension vessel 122 and main liquid recirculation pipe 160, thus continuously replenishing the liquid drawn from the receiving/settling vessel 210 by the air lift pump effect.

The compostable material deposited by the user into the reactor vessel 116 may contain non-compostable material that is heavier than water (e.g., small stones, grit etc.). As well, the biologic reaction facilitated in the reactor vessel 116 may produce aerobic granules (also referred to as floc granules) that may be heavier than water. In normal operation, such heavy non-compostable material and aerobic granules tend to settle into the receiving/settling vessel 210 (which is why it may be desirable to be able to isolate, disconnect and break down the receiving/settling vessel 210 for cleaning). The bottom projection 230 is understood to increase flow velocity/agitation within the reactor vessel 116, so as to bring, or maintain, some of the heavy non-compostable material and aerobic granules in suspension, such that they may be carried upwards by the air lift pump effect to the reactor vessel.

During operation, the height of the liquid in the reactor vessel 116 must be at least as high as the vertical location of the return vessel to suspension vessel conduit 140 in order for the main liquid circulation (i.e., from the receiving/settling assembly 112 through the aeration body 114, reactor vessel 116, settleable solids return vessel 120, particle suspension vessel 122 and main liquid recirculation pipe 160 back to the receiving/settling assembly 112) to occur. As the particle suspension vessel 122 is "downstream" from the reactor vessel 116 (in terms of the main liquid circulation) the height of liquid in the particle suspension vessel 122 (and thus whether it flows into the to the overflow reservoir 124 via the overflow pipe 150) primarily depends on the height of liquid in the reactor vessel 116.

The nutrient-rich liquid (similar liquids are at times referred to as "compost teas") that flows into the overflow reservoir 124 during normal operation of the composting apparatus 100, may be drained from the overflow reservoir 124 by the user for use as a liquid fertilizer. Water tends to be a significant part of much of the material that is typically composted (e.g., plant matter, foods etc.). As well, water is a product of the aerobic biological reactions promoted and accelerated by the composting apparatus 100. Thus, although it may be useful to add water to the composting apparatus 100 from time to time, generally it will not be necessary to add a volume of water equal to the amount of liquid that may have flowed into the overflow reservoir 124. It has been found that merely feeding the usual types of compostable material to the reactor vessel 116 will generally maintain sufficient water in the composting apparatus 100.

In a prototype of the embodiment shown in the drawings: each of the first choke 272, second choke 276, third choke 280 and aeration choke ring 284 has an internal diameter of 1 inch; each of the first aeration chamber 270, second aeration chamber 274 and third aeration chamber 278 has an internal diameter of 4 inches and a height of 4 inches; the reactor vessel 116 has an internal diameter of 12 inches and a height (from the top of the aeration body 114 to the parabolic top inlet 308) of about 30 inches; the settleable solids return vessel 120 and particle suspension vessel 122 each have an internal diameter of 4 inches; the reactor vessel outflow 130 and reactor vessel outflow downspout 132 have an internal diameter of 2 inches; the reactor vessel return 134 and main liquid recirculation pipe 160 have an internal diameter of 1½ inches; the wash assembly supply pipe 166 has an internal diameter of ⅜ inch; the air supply line 172 has an internal diameter of ¾ inch; the overflow diffuser air supply line 182 and wash air supply line 190 have an internal diameter of no greater than ¼ inch; and the air compressor 110 is rated to provide a pressure of 0.10 MPa and output capacity of 70 liters per minute.

It has been found that aeration chambers with choke diameter (i.e., chamber inlet diameter) to maximum diameter to height ratios of 1:4:4 provide good performance. It has also been found that in ideal experimental conditions, a single aeration chamber will provide significant enhanced aeration, with additional chambers increasing aeration incrementally rather than in a linear manner. However, experience indicates that under actual operational conditions (which include variations in flow rates and volumes), it is desirable to have at least two chambers and more preferably three chambers, but that having more than three chambers does not appreciably improve performance.

Figure 2:
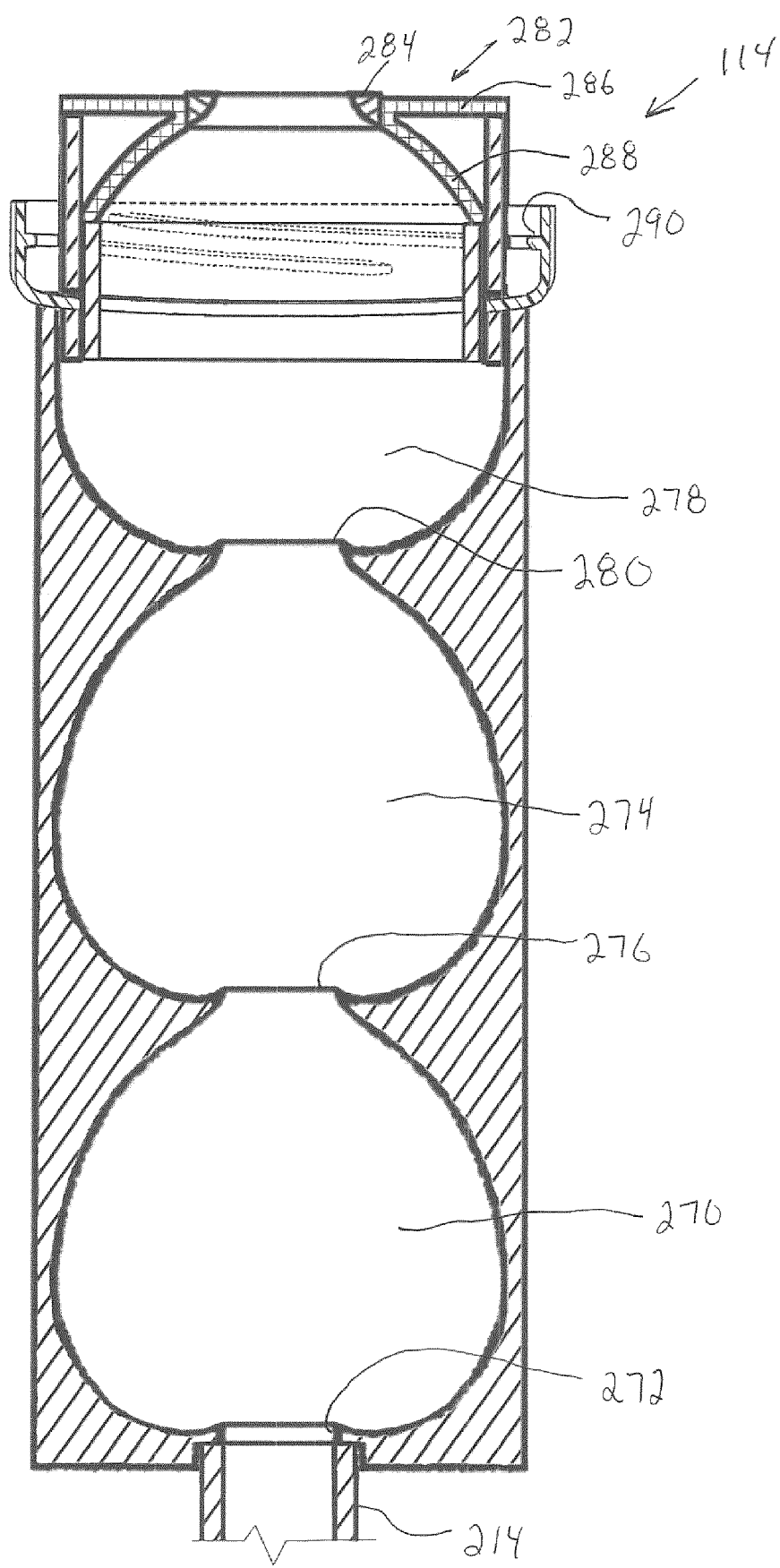
FIG. 2 is an elevation sectional view of the aeration body of the embodiment shown in FIG. 1.
Figure 3:
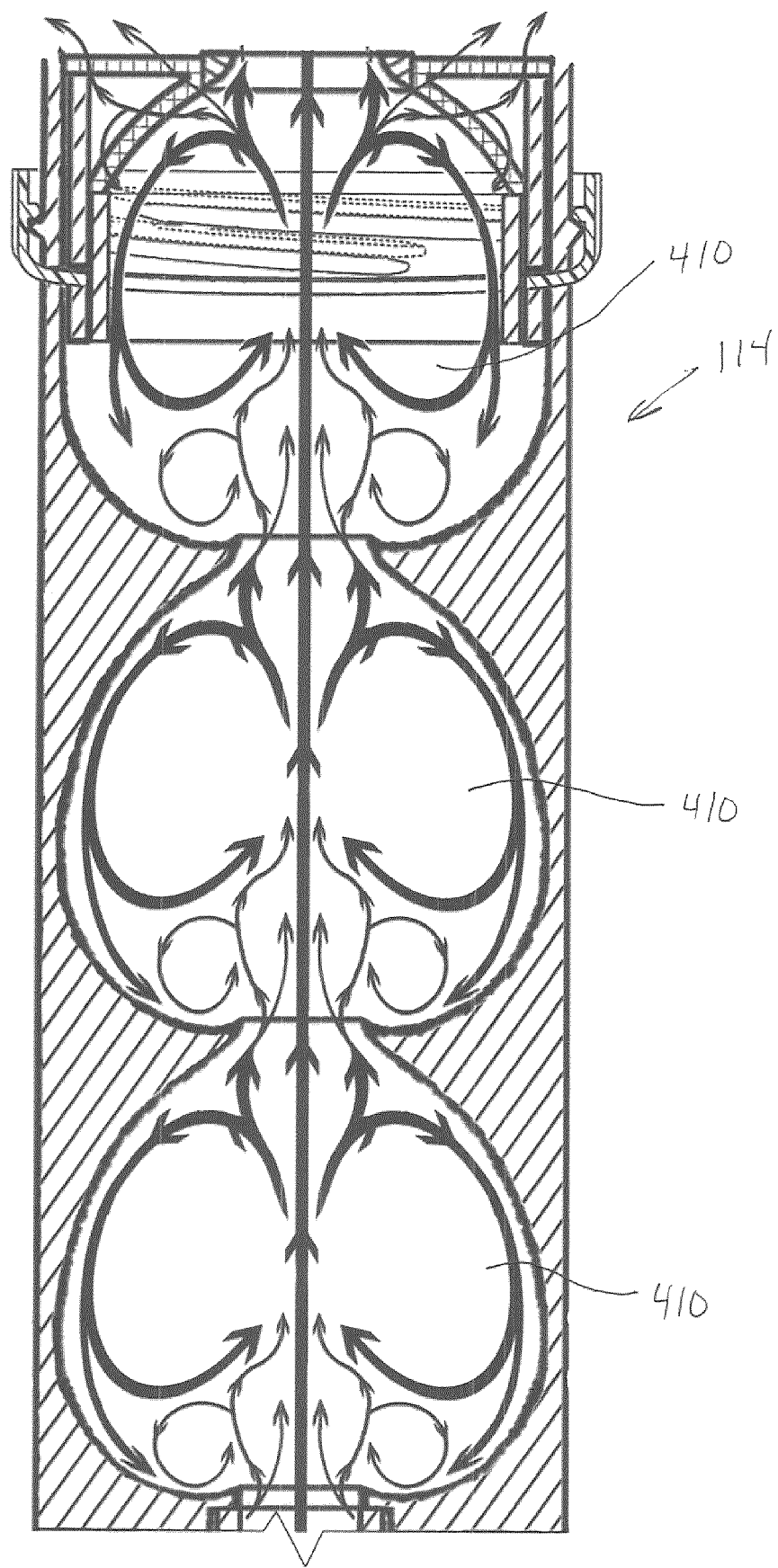
FIG. 3 is an elevation sectional view of the aeration body shown in FIG. 2, with observed and modeled flow patterns indicated by arrows.
Figure 4:
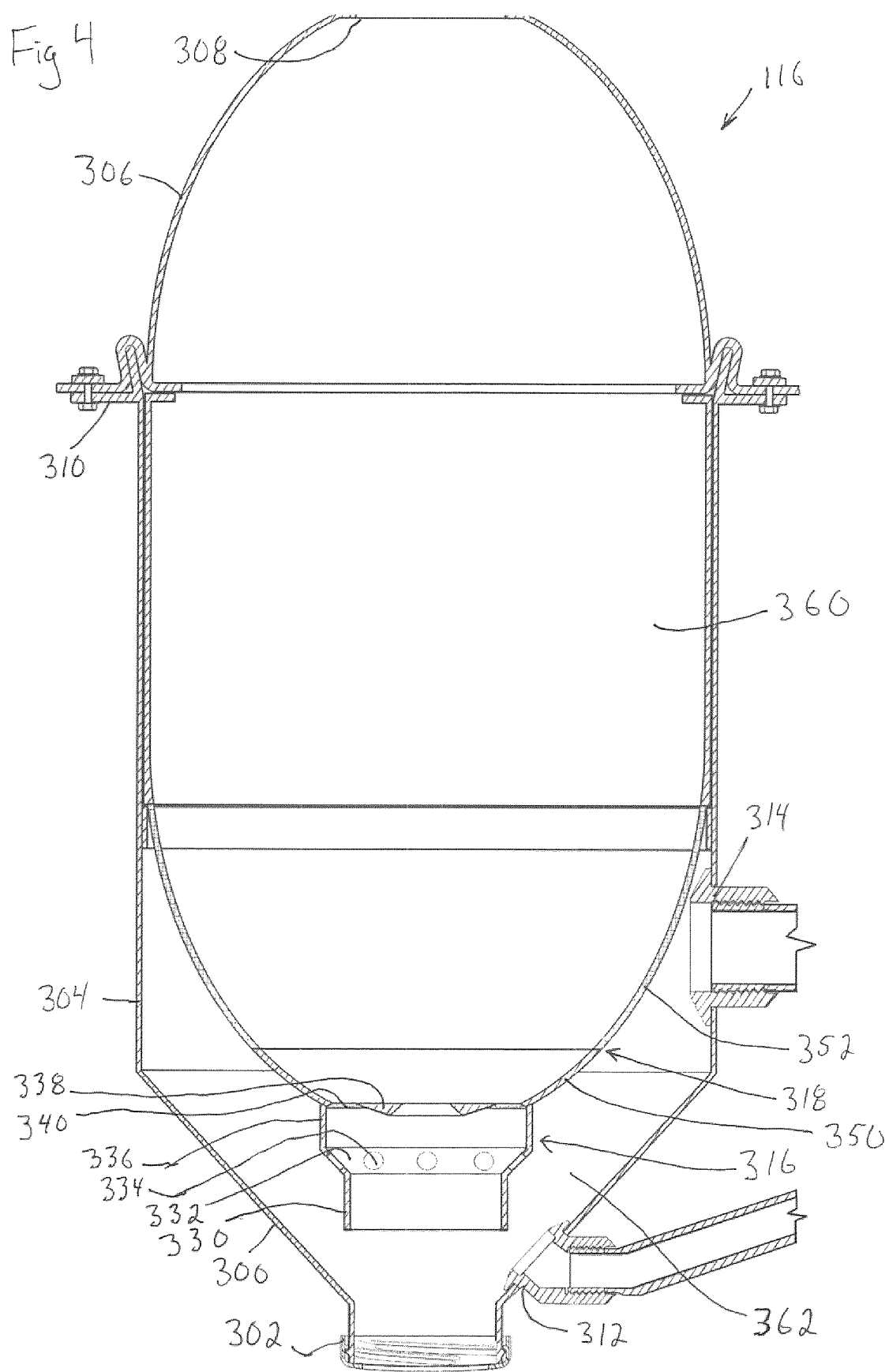
FIG. 4 is an elevation sectional view of the reactor vessel of the embodiment shown in FIG. 1.
Figure 5:
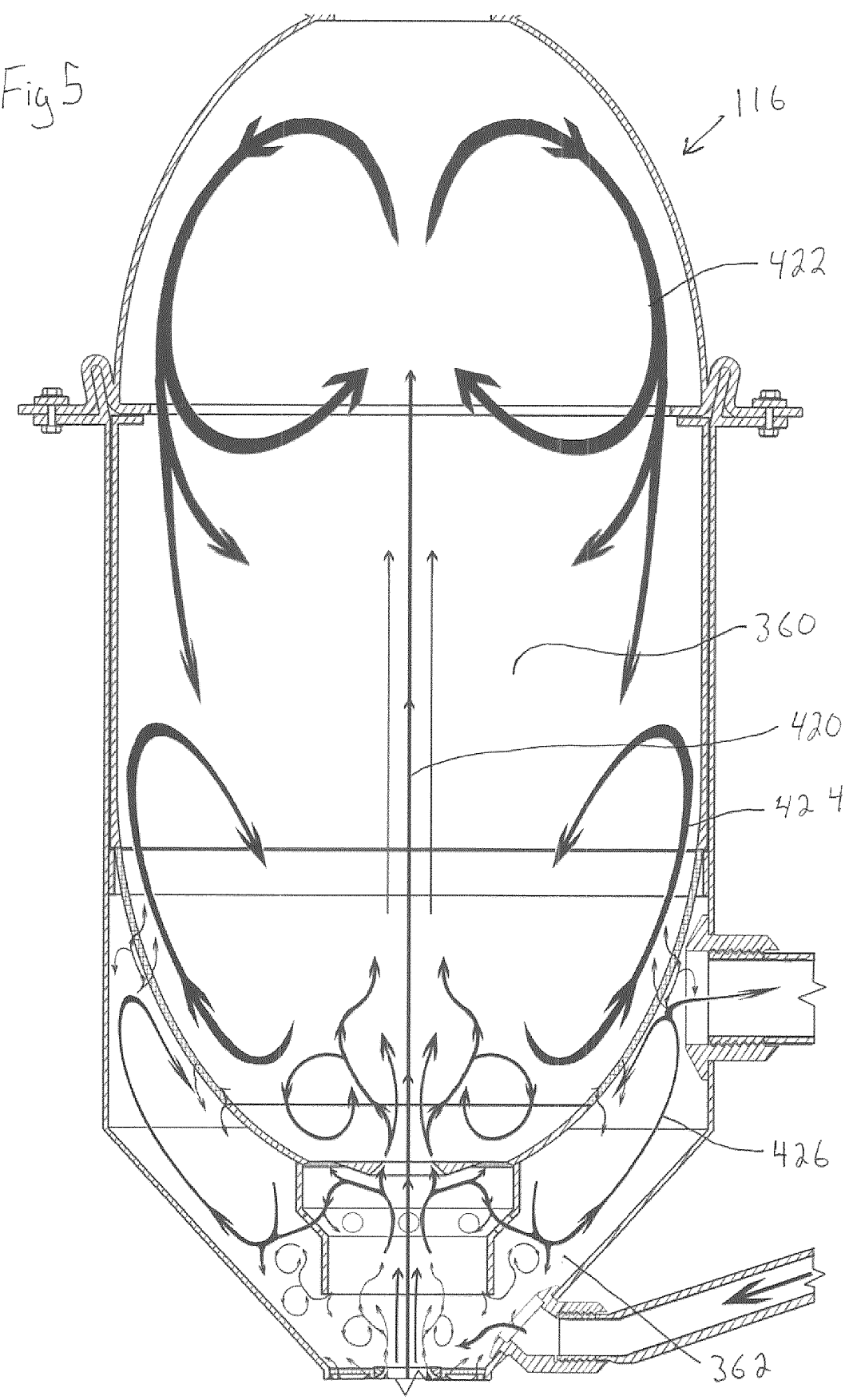
FIG. 5 is an elevation sectional view of the reactor vessel shown in FIG. 4, with observed and modeled flow patterns indicated by arrows.
Figure 6:
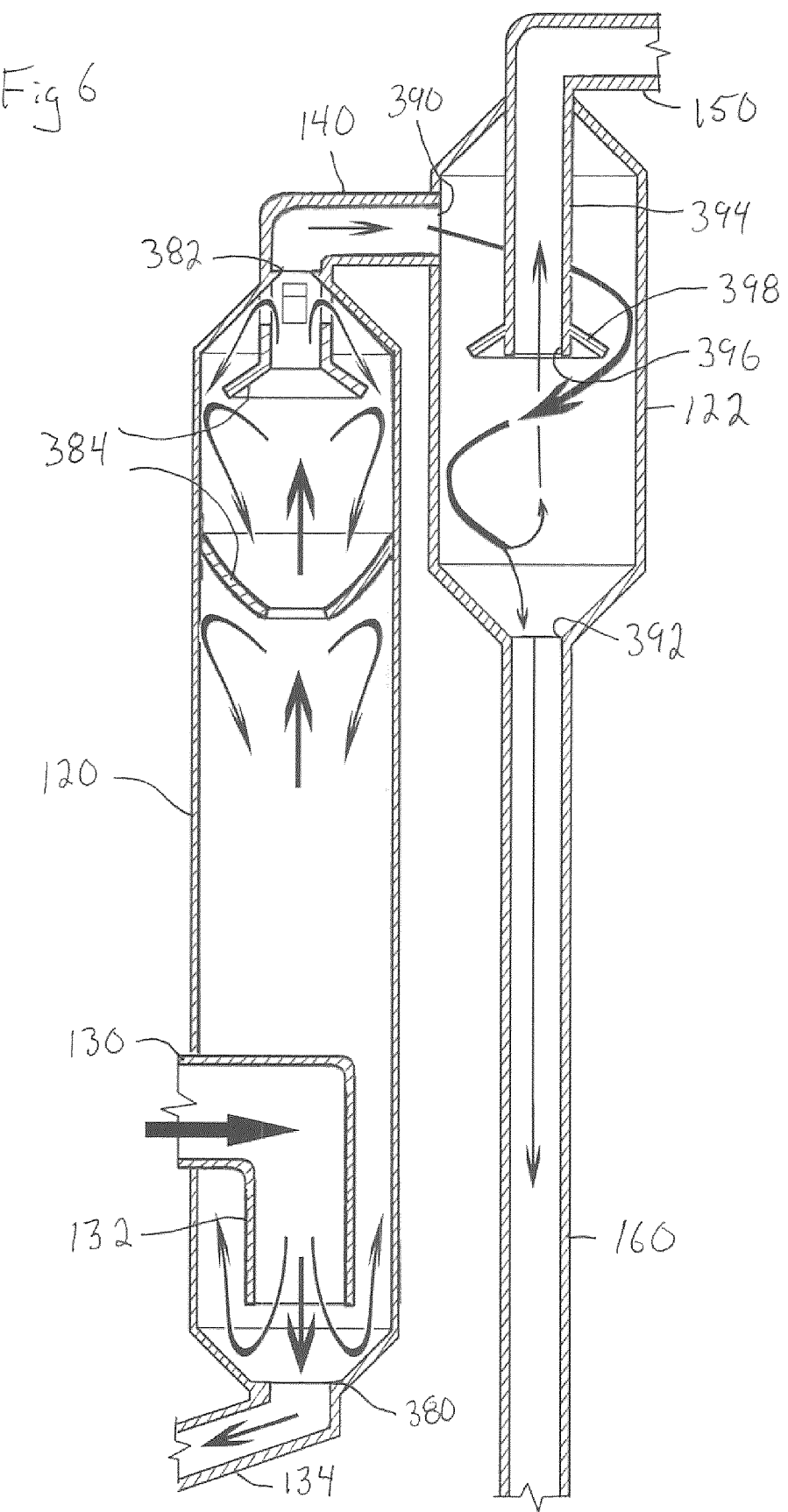
FIG. 6 is an elevation sectional view of the settleable solids return vessel and particle suspension vessel of the embodiment shown in FIG. 1, with observed and modeled flow patterns indicated by arrows.

As indicated in FIGS. 1-3 it is understood that an optimum general shape for each of the first aeration chamber 270, second aeration chamber 274 and third aeration chamber 278, would be substantially spheroidal. However, as indicated in FIGS. 7 to 10, it has been found that acceptable performance may be achieved with aeration chambers configured based on a combination of conical and cylindrical components.

Figure 7:
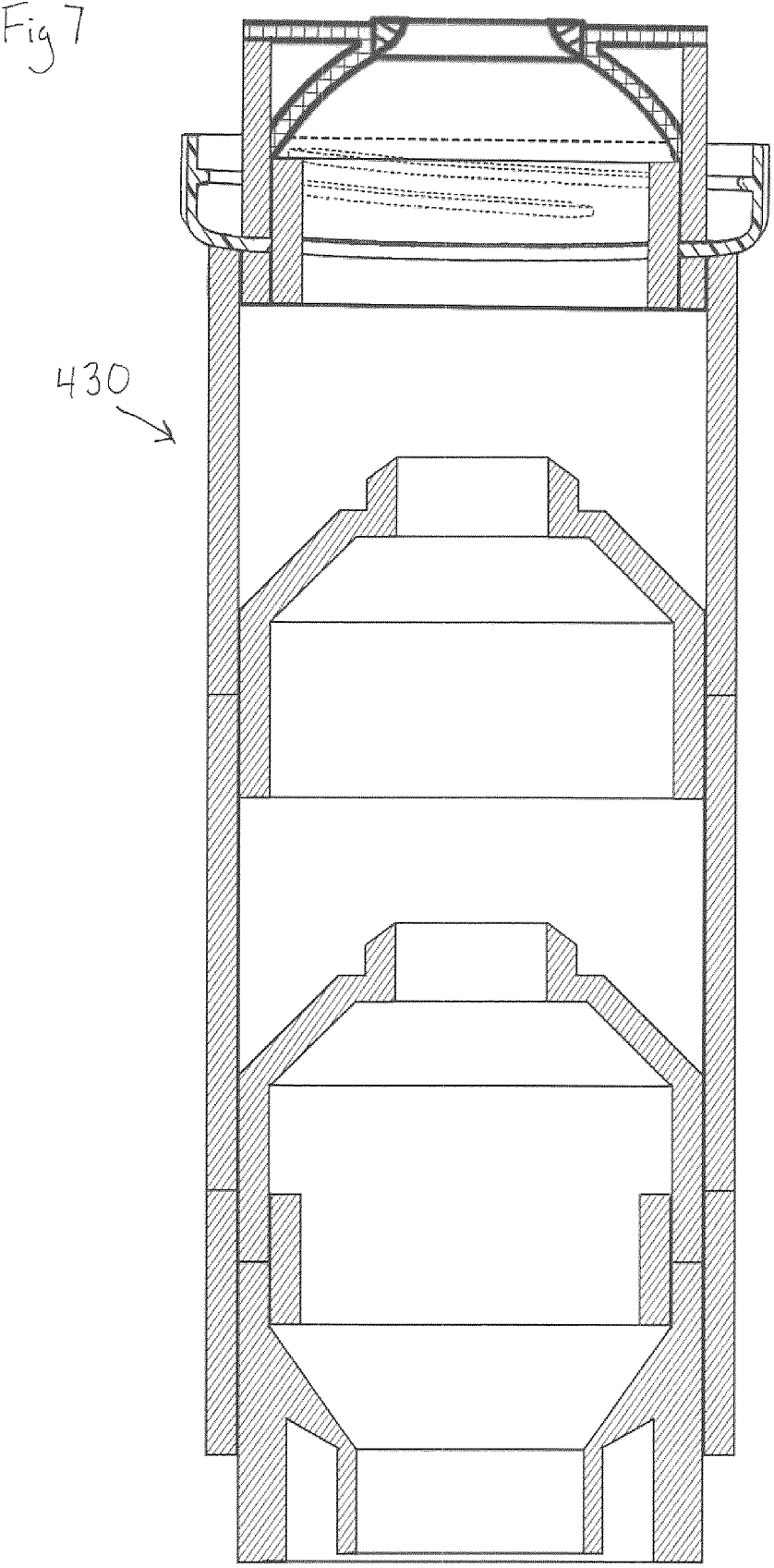
FIG. 7 is an elevation sectional view of a prototype aeration body embodiment, fabricated using conventional plastic (e.g., acrylonitrile butadiene styrene (ABS) or polyvinyl chloride (PBS)) pipe fittings.
Figure 8:
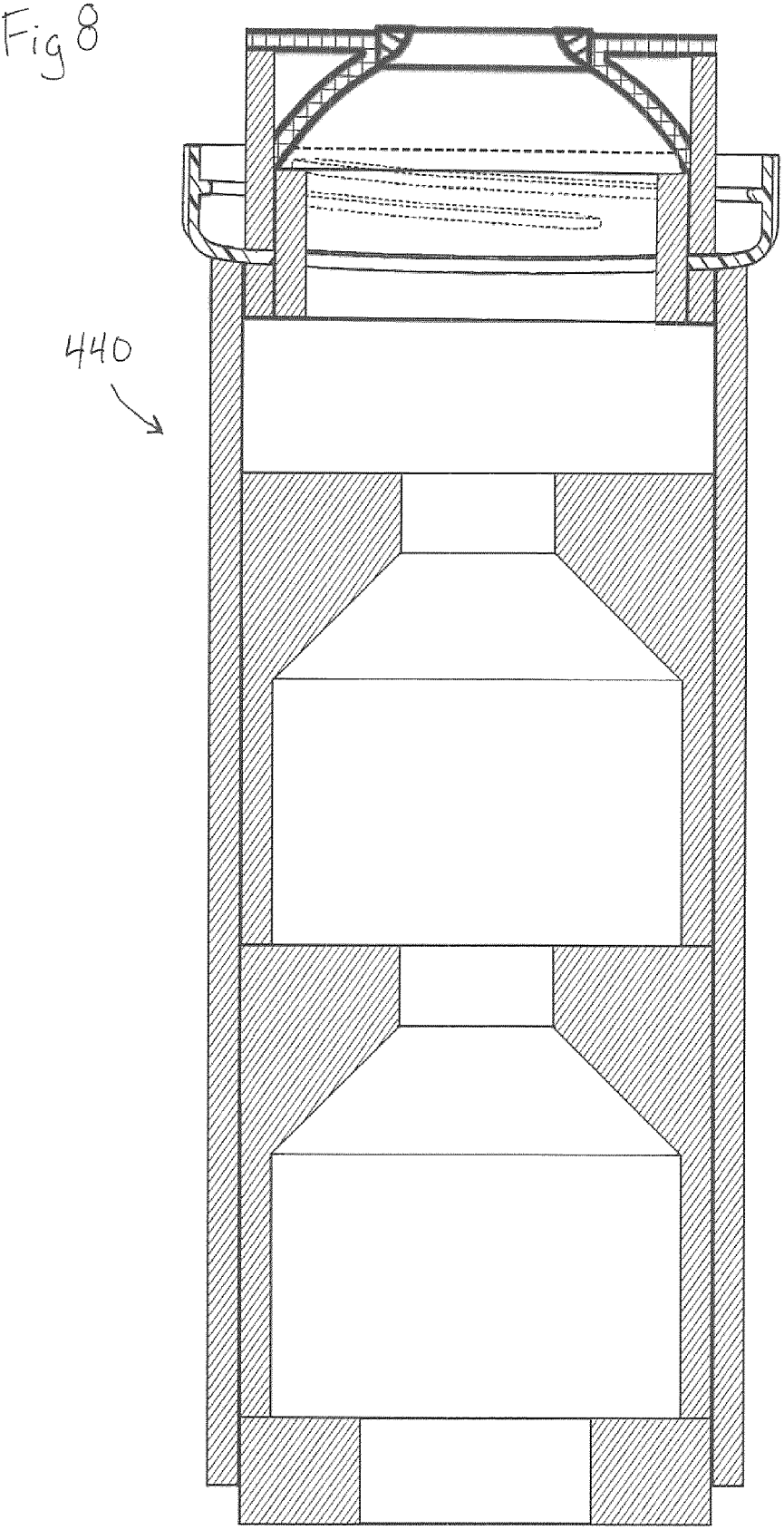
FIG. 8 is an elevation sectional view of a conic-cylinder chamber aeration body embodiment.
Figure 9:
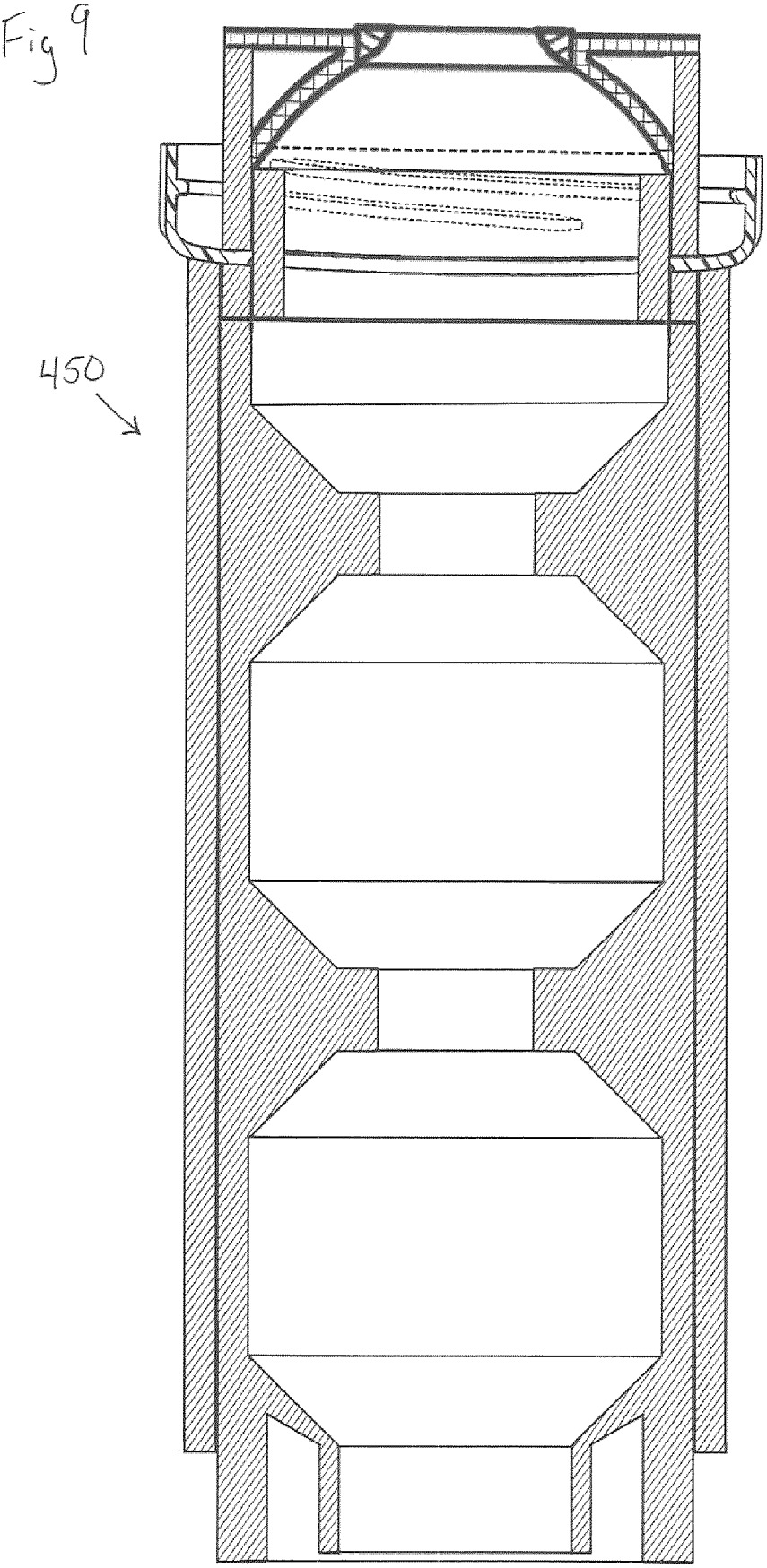
FIG. 9 is an elevation sectional view of a conic-cylinder-conic chamber aeration body embodiment.
Figure 10:
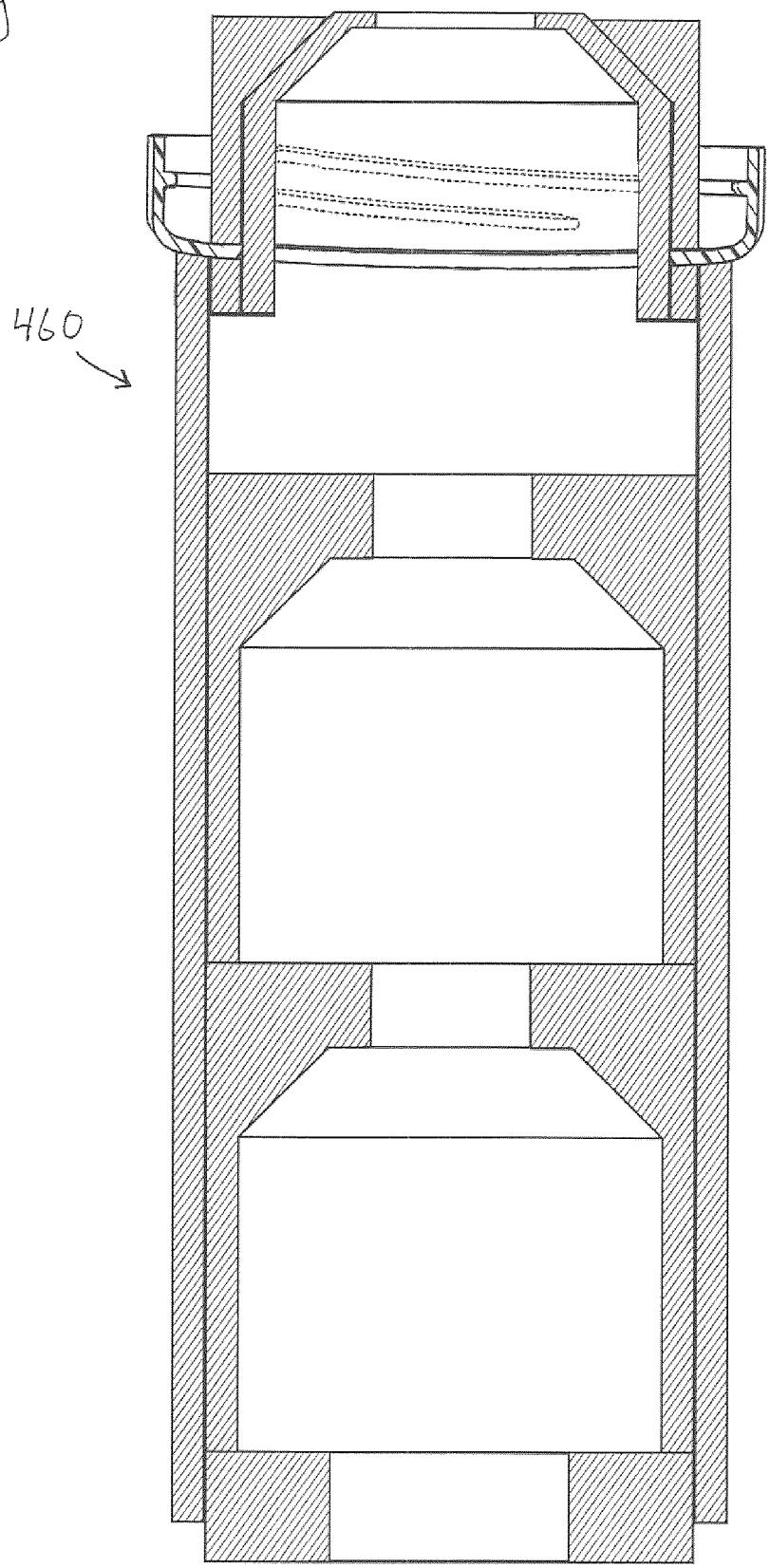
FIG. 10 is an elevation sectional view of a conic-cylinder chamber meshless aeration body embodiment.

FIG. 7 shows a prototype aeration body 430, fabricated using ABS plastic pipe fittings, in which the aeration chambers have irregular and inconsistent internal configurations. FIG. 8 shows a conic-cylinder chamber aeration body 440, in which two of the aeration chambers have flat bottoms cylindrical sides and conical ceilings. FIG. 9 shows a conic-cylinder-conic chamber aeration body 450, in which the aeration chambers have conical bottoms, cylindrical sides and conical ceilings. FIG. 10 shows a conic-cylinder chamber meshless aeration body 460, which is akin to the conic-cylinder chamber aeration body 440 except that the ceiling of the uppermost aeration chamber is meshless.

The scope of the claims should not be limited by the preferred embodiments set forth in the examples, but should be given the broadest interpretation consistent with the description as a whole.

What is claimed is:

1. An apparatus for mixing air and a liquid, for enabling reactions involving the air and the liquid, the apparatus comprising:
   a mixing body comprising a first mixing chamber having:
      a first chamber cavity with a first cavity inner periphery and a first chamber cavity cross sectional area, being the cross sectional area at the first chamber cavity inner periphery;
      a first chamber inlet into the first chamber cavity, having a first chamber inlet cross sectional area;
      a first chamber outlet from the first chamber cavity, having a first chamber outlet cross sectional area; and
      a first chamber distance being the distance between the first chamber inlet and the first chamber outlet;
   wherein:
      the first chamber inlet cross sectional area is in the range of about 1 to about 2 times the first chamber outlet cross sectional area;
      the first chamber cavity cross sectional area is in the range of about 10 to 20 times the first chamber outlet cross sectional area; and
      a square of the first chamber distance is in the range of about 10 to 20 times the first chamber outlet cross sectional area;
   a flow inducing means for causing a flow of the air and the liquid through the first chamber inlet to and through the first chamber outlet via the first chamber cavity;
   wherein the flow through the first chamber inlet to and through the first chamber outlet establishes a toroidal vortex extending about the first cavity inner periphery; and
   wherein:
      the flow inducing means includes an upstream air introduction, being means for introducing the air into the liquid at a location that, in terms of a direction of the flow through the first chamber inlet to and through the first chamber outlet is upstream of the first mixing chamber, wherein the upstream air introduction includes an air compressor for drawing in and providing air; and
      the first chamber inlet and the first chamber outlet are vertically displaced relative to each other wherein the flow through the first chamber inlet to and through the first chamber outlet results from a gas lift effect induced by the upstream air introduction; and
   further comprising:
      a reactor vessel in fluid communication with the mixing body, wherein the flow through the first chamber inlet to and through the first chamber outlet continues as flow into the reactor vessel, the reactor vessel including an air vent for venting off the air and an outflow outlet;
      a main recirculation conduit providing fluid communication between the reactor vessel outflow outlet and the vicinity of the location of upstream air introduction;
      whereby liquid in the reactor vessel may flow to the location of upstream air introduction via the main recirculation conduit.

2. The apparatus of claim 1, wherein the first cavity inner periphery is circular and has a first chamber cavity diameter.

3. The apparatus of claim 2, wherein:
the first chamber inlet is circular and has a first chamber inlet diameter; and
the first chamber outlet is circular and has a first chamber outlet diameter;
wherein:
the first chamber inlet diameter is in the range of about 1 to about 1½ times the first chamber outlet diameter;
the first chamber cavity diameter is about 4 times the first chamber outlet diameter; and
the first chamber distance is about 4 times the first chamber outlet diameter.

4. The apparatus of claim 1, wherein the mixing body further comprises:
a second mixing chamber having:
a second chamber cavity with a second cavity inner periphery and a second chamber cavity cross sectional area, being the cross sectional area at the second chamber cavity inner periphery;
a second chamber inlet into the second chamber cavity, having a second chamber inlet cross sectional area;
a second chamber outlet from the second chamber cavity, having a second chamber outlet cross sectional area; and
a second chamber distance being the distance between the second chamber inlet and the second chamber outlet;
wherein:
the second chamber inlet cross sectional area is in the range of about 1 to about 2 times the second chamber outlet cross sectional area;
the second chamber cavity cross sectional area is in the range of about 10 to 20 times the second chamber outlet cross sectional area; and
a square of the second chamber distance is in the range of about 10 to 20 times the second chamber outlet cross sectional area;
the second mixing chamber is interconnected with the first mixing chamber wherein the flow through the first chamber inlet to and through the first chamber outlet continues through the second chamber inlet through and to the second chamber outlet via the second chamber cavity;
wherein the flow through the second chamber inlet to and through the second chamber outlet establishes a toroidal vortex extending about the second cavity inner periphery.

5. The apparatus of claim 1, wherein:
the liquid comprises water;
the reactor vessel includes an inlet for receiving organic material into the reactor vessel and a reactor vessel inner wall;
the flow into the reactor vessel establishes a reactor vessel toroidal vortex extending about the reactor vessel inner wall;
whereby the reactor vessel toroidal vortex agitates the air, water and organic material, so as to facilitate aerobic biological reactions.

6. The apparatus of claim 5, wherein the reactor vessel includes an internal partial divider defining:
an upper agitation region in which the reactor vessel toroidal vortex is located; and
a lower separation region in which the outlet, outlet is located.

7. The apparatus of claim 6, wherein the internal partial divider includes a central opening and a permeable basket wall.

8. The apparatus of claim 6, further comprising:
an overflow line; and
a separation assembly interposed between the reactor vessel and the main recirculation conduit, and comprising:
a settleable solids return vessel for receiving water from the reactor vessel and returning water containing settleable solids to the lower separation region; and
a particle suspension vessel for: receiving water with lowered settleable solids from the settleable solids return vessel; enhancing suspension of buoyant material in the water with lowered settleable solids; conveying the water with enhanced suspension of buoyant material and lowered settleable solids to the main recirculation conduit; and intermittently passing water to the overflow line.

9. The apparatus of claim 8, further comprising an overflow reservoir connected to the overflow line.

10. The apparatus of claim 9, wherein the overflow reservoir includes an air diffuser in fluid communication with the air compressor.

11. The apparatus of claim 5, further comprising means for suppressing foam within the reactor vessel, comprising:
a wash assembly disposed at the top of the reactor vessel;
a wash assembly supply pipe providing fluid communication between the main recirculation conduit and the wash assembly; and
a wash air supply line providing fluid communication between the air compressor and the wash assembly supply pipe;
wherein air provided by the air compressor flows to the wash assembly supply pipe via the wash air supply line, inducing a gas lift effect in the wash assembly supply pipe that draws liquid from the main recirculation conduit and conveys the water to the wash assembly where it is dispersed within the reactor vessel.

12. The apparatus of claim 1, wherein the first mixing chamber is substantially spheroidal.

13. The apparatus of claim 1, wherein the first mixing chamber is conical in the vicinity of the first chamber outlet and cylindrical at the first cavity inner periphery.

14. The apparatus of claim 13, wherein the first mixing chamber is conical in the vicinity of the first chamber inlet.

15. The apparatus of claim 13, wherein the first mixing chamber is planar in the vicinity of the first chamber inlet.

* * * * *